(12) United States Patent
Thomson et al.

(10) Patent No.: US 8,762,519 B2
(45) Date of Patent: Jun. 24, 2014

(54) SYSTEM AND METHOD FOR PROVIDING LOCATION SERVICES FOR MULTIPLE ACCESS NETWORKS FROM A SINGLE LOCATION SERVER

(75) Inventors: Martin Thomson, Keiraville (AU); James Winterbottom, Gwynneville (AU); Gary Neil Justusson, Figtree (AU); Eddy Corbett, Gwynneville (AU)

(73) Assignee: Andrew LLC, Hickory, NC (US)

( * ) Notice: Subject to any disclaimer, the term of this patent is extended or adjusted under 35 U.S.C. 154(b) by 1101 days.

(21) Appl. No.: 12/562,671

(22) Filed: Sep. 18, 2009

(65) Prior Publication Data

US 2010/0106774 A1 Apr. 29, 2010

Related U.S. Application Data

(60) Provisional application No. 61/109,068, filed on Oct. 28, 2008.

(51) Int. Cl.
*G06F 15/173* (2006.01)

(52) U.S. Cl.
USPC ...................................................... 709/224

(58) Field of Classification Search
USPC ........................................ 709/203, 224, 230
See application file for complete search history.

(56) References Cited

U.S. PATENT DOCUMENTS

| 3,150,372 | A | 9/1964 | Groth, Jr. |
| 3,659,085 | A | 4/1972 | Potter et al. |
| 4,728,959 | A | 3/1988 | Maloney |
| 4,814,751 | A | 3/1989 | Hawkins |
| 4,845,504 | A | 7/1989 | Roberts et al. |
| 4,891,650 | A | 1/1990 | Sheffer |
| 5,056,106 | A | 10/1991 | Wang |
| 5,218,618 | A | 6/1993 | Sagey |
| 5,317,323 | A | 5/1994 | Kennedy et al. |
| 5,327,144 | A | 7/1994 | Stilp et al. |

(Continued)

FOREIGN PATENT DOCUMENTS

JP 06-347529 12/1994
WO 2006088472 A1 8/2006

OTHER PUBLICATIONS

Patel, Vijay, "LIS-AL Architecture, and FLAP," IEEE article, doc. No. 802.11-07/2889r0, Nov. 12, 2007.

(Continued)

*Primary Examiner* — Rupal Dharia
*Assistant Examiner* — Robert B. McAdams
(74) *Attorney, Agent, or Firm* — Duane Morris LLP (57) ABSTRACT

A system and method for determining the location of a target device attached to an access network connected to a location server, the location server having a plurality of access networks connected thereto. A location request may be received for a target device whereby the target device is identified as a function of one or more parameters. An access network may be identified from the plurality of access networks to which the target device is attached as a function of the one or more parameters. Each access network in the plurality of access networks connected to the location server may be assigned one or more logical identifiers by which an individual location request may be allocated to the respective access network. An estimated location of the target device may then be determined as a function of the one or more logical identifiers using a location algorithm appropriate for the identified access network.

16 Claims, 7 Drawing Sheets

(56) References Cited

U.S. PATENT DOCUMENTS

| | | |
|---|---|---|
| 5,365,544 A | 11/1994 | Schilling |
| 5,372,144 A | 12/1994 | Mortier et al. |
| 5,404,376 A | 4/1995 | Dent |
| 5,423,067 A | 6/1995 | Manabe |
| 5,465,289 A | 11/1995 | Kennedy |
| 5,506,863 A | 4/1996 | Meidan et al. |
| 5,506,864 A | 4/1996 | Schilling |
| 5,508,708 A | 4/1996 | Ghosh et al. |
| 5,512,908 A | 4/1996 | Herrick |
| 5,515,419 A | 5/1996 | Sheffer |
| 5,519,760 A | 5/1996 | Borkowski et al. |
| 5,559,864 A | 9/1996 | Kennedy |
| 5,592,180 A | 1/1997 | Yokev et al. |
| 5,608,410 A | 3/1997 | Stilp et al. |
| 5,614,914 A | 3/1997 | Bolgiano et al. |
| 5,675,344 A | 10/1997 | Tong et al. |
| 5,736,964 A | 4/1998 | Ghosh et al. |
| 5,815,538 A | 9/1998 | Grell et al. |
| 5,825,887 A | 10/1998 | Lennen |
| 5,870,029 A | 2/1999 | Otto et al. |
| 5,920,278 A | 7/1999 | Tyler et al. |
| 5,952,969 A | 9/1999 | Hagerman et al. |
| 5,959,580 A | 9/1999 | Maloney et al. |
| 5,960,341 A | 9/1999 | LeBlanc et al. |
| 5,973,643 A | 10/1999 | Hawkes et al. |
| 5,987,329 A | 11/1999 | Yost |
| 6,014,102 A | 1/2000 | Mitzlaff et al. |
| 6,047,192 A | 4/2000 | Maloney |
| 6,091,362 A | 7/2000 | Stilp |
| 6,097,336 A | 8/2000 | Stilp |
| 6,097,709 A | 8/2000 | Kuwabara |
| 6,097,959 A | 8/2000 | Yost |
| 6,101,178 A | 8/2000 | Beal |
| 6,108,555 A | 8/2000 | Maloney et al. |
| 6,108,558 A | 8/2000 | Vanderspool, II |
| 6,115,599 A | 9/2000 | Stilp |
| 6,115,605 A | 9/2000 | Siccardo et al. |
| 6,119,013 A | 9/2000 | Maloney et al. |
| 6,127,975 A | 10/2000 | Maloney |
| 6,144,711 A | 11/2000 | Raleigh et al. |
| 6,172,644 B1 | 1/2001 | Stilp |
| 6,184,829 B1 | 2/2001 | Stilp |
| 6,188,351 B1 | 2/2001 | Bloebaum |
| 6,191,738 B1 | 2/2001 | Pfeil et al. |
| 6,201,499 B1 | 3/2001 | Hawkes et al. |
| 6,201,803 B1 | 3/2001 | Munday et al. |
| 6,212,319 B1 | 4/2001 | Cayrefourcq |
| 6,233,459 B1 | 5/2001 | Sullivan et al. |
| 6,246,884 B1 | 6/2001 | Karmi et al. |
| 6,266,013 B1 | 7/2001 | Stilp et al. |
| 6,269,246 B1 | 7/2001 | Rao et al. |
| 6,281,834 B1 | 8/2001 | Stilp |
| 6,285,321 B1 | 9/2001 | Stilp et al. |
| 6,288,675 B1 | 9/2001 | Maloney |
| 6,288,676 B1 | 9/2001 | Maloney |
| 6,295,455 B1 | 9/2001 | Fischer et al. |
| 6,311,043 B1 | 10/2001 | Haardt et al. |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,351,235 B1 | 2/2002 | Stilp |
| 6,366,241 B2 | 4/2002 | Pack |
| 6,388,618 B1 | 5/2002 | Stilp et al. |
| 6,393,294 B1 | 5/2002 | Perez-Breva et al. |
| 6,400,320 B1 | 6/2002 | Stilp et al. |
| 6,407,703 B1 | 6/2002 | Minter et al. |
| 6,449,486 B1 | 9/2002 | Rao |
| 6,463,290 B1 | 10/2002 | Stilp et al. |
| 6,470,195 B1 | 10/2002 | Meyer |
| 6,477,161 B1 | 11/2002 | Hudson |
| 6,483,460 B2 | 11/2002 | Stilp et al. |
| 6,492,944 B1 | 12/2002 | Stilp |
| 6,501,955 B1 | 12/2002 | Durrant et al. |
| 6,519,465 B2 | 2/2003 | Stilp et al. |
| 6,546,256 B1 | 4/2003 | Maloney |
| 6,553,322 B1 | 4/2003 | Ignagni |
| 6,563,460 B2 | 5/2003 | Stilp et al. |
| 6,571,082 B1 | 5/2003 | Rahman |
| 6,591,112 B1 | 7/2003 | Siccardo et al. |
| 6,603,428 B2 | 8/2003 | Stilp |
| 6,603,761 B1 | 8/2003 | Wang |
| 6,640,106 B2 | 10/2003 | Gutowski et al. |
| 6,646,604 B2 | 11/2003 | Anderson |
| 6,661,379 B2 | 12/2003 | Stilp et al. |
| 6,765,531 B2 | 7/2004 | Anderson |
| 6,771,625 B1 | 8/2004 | Beal |
| 6,771,969 B1 | 8/2004 | Chinoy |
| 6,782,264 B2 | 8/2004 | Anderson |
| 6,782,265 B2 | 8/2004 | Perez-Breva et al. |
| 6,834,234 B2 | 12/2004 | Scherzinger et al. |
| 6,839,539 B2 | 1/2005 | Durrant et al. |
| 6,845,240 B2 | 1/2005 | Carlson et al. |
| 6,859,172 B2 | 2/2005 | Powers et al. |
| 6,871,077 B2 | 3/2005 | Kennedy, Jr. |
| 6,873,290 B2 | 3/2005 | Anderson et al. |
| 6,876,859 B2 | 4/2005 | Anderson et al. |
| 6,920,329 B2 | 7/2005 | Kennedy, Jr. et al. |
| 6,922,170 B2 | 7/2005 | Alexander, Jr. |
| 6,944,465 B2 | 9/2005 | Spain et al. |
| 6,952,158 B2 | 10/2005 | Kennedy, Jr. |
| 6,987,979 B2 | 1/2006 | Carlsson |
| 6,996,392 B2 | 2/2006 | Anderson |
| 7,023,383 B2 | 4/2006 | Stilp et al. |
| 7,116,987 B2 | 10/2006 | Spain, Jr. et al. |
| 7,167,713 B2 | 1/2007 | Anderson |
| 7,167,714 B2 | 1/2007 | Dressler et al. |
| 7,233,799 B2 | 6/2007 | Spain, Jr. |
| 7,250,907 B2 | 7/2007 | Krumm et al. |
| 7,257,414 B2 | 8/2007 | Spain, Jr. et al. |
| 7,271,765 B2 | 9/2007 | Stilp et al. |
| 7,340,259 B2 | 3/2008 | Maloney |
| 7,383,051 B2 | 6/2008 | Spain, Jr. et al. |
| 7,427,952 B2 | 9/2008 | Bull et al. |
| 7,433,652 B2 | 10/2008 | Durgin |
| 7,433,695 B2 | 10/2008 | Gordon et al. |
| 7,440,762 B2 | 10/2008 | Maloney et al. |
| 7,460,505 B2 | 12/2008 | Spain |
| 7,574,222 B2 * | 8/2009 | Sawada et al. ............ 455/456.3 |
| 7,593,738 B2 | 9/2009 | Anderson |
| 7,725,111 B2 | 5/2010 | Dressler et al. |
| 7,734,298 B2 | 6/2010 | Bhattacharya et al. |
| 7,753,278 B2 | 7/2010 | Spain, Jr. et al. |
| 7,796,966 B2 | 9/2010 | Bhattacharya et al. |
| 7,844,702 B1 * | 11/2010 | Manczak et al. ............ 709/224 |
| 7,848,762 B2 | 12/2010 | Gordon et al. |
| 7,899,467 B2 | 3/2011 | Feuerstein et al. |
| 7,933,580 B2 * | 4/2011 | Hasenfang et al. ........ 455/404.2 |
| 8,013,785 B2 | 9/2011 | Bhattacharya et al. |
| 8,068,802 B2 | 11/2011 | Bhattacharya et al. |
| 8,068,855 B2 | 11/2011 | Dressler et al. |
| 8,106,817 B2 | 1/2012 | Bhattacharya et al. |
| 8,106,818 B2 | 1/2012 | Bhattacharya et al. |
| 8,155,394 B2 | 4/2012 | Allegra et al. |
| 2002/0172223 A1 | 11/2002 | Stilp et al. |
| 2003/0064734 A1 | 4/2003 | Stilp et al. |
| 2003/0139188 A1 | 7/2003 | Chen et al. |
| 2003/0190919 A1 | 10/2003 | Niemenmaa |
| 2003/0203738 A1 | 10/2003 | Brown et al. |
| 2004/0043775 A1 | 3/2004 | Kennedy, Jr. et al. |
| 2004/0132466 A1 | 7/2004 | Kennedy, Jr. et al. |
| 2004/0203539 A1 | 10/2004 | Benes et al. |
| 2004/0203921 A1 | 10/2004 | Bromhead et al. |
| 2004/0218664 A1 | 11/2004 | Kennedy, Jr. et al. |
| 2004/0252752 A1 | 12/2004 | Kennedy, Jr. et al. |
| 2005/0058182 A1 | 3/2005 | Kennedy, Jr. et al. |
| 2005/0136945 A1 | 6/2005 | Kennedy, Jr. et al. |
| 2005/0164712 A1 | 7/2005 | Kennedy, Jr. et al. |
| 2005/0192026 A1 | 9/2005 | Carlson et al. |
| 2006/0003695 A1 | 1/2006 | Kennedy, Jr. et al. |
| 2006/0003775 A1 | 1/2006 | Bull et al. |
| 2006/0030333 A1 | 2/2006 | Ward et al. |
| 2006/0106930 A1 * | 5/2006 | Shaffer ........................ 709/224 |
| 2006/0116130 A1 | 6/2006 | Kennedy, Jr. et al. |
| 2006/0125695 A1 | 6/2006 | Kennedy, Jr. et al. |

(56) References Cited

U.S. PATENT DOCUMENTS

| | | | |
|---|---|---|---|
| 2006/0141998 | A1 | 6/2006 | Kennedy, Jr. et al. |
| 2006/0154607 | A1 | 7/2006 | Kennedy, Jr. et al. |
| 2006/0240836 | A1 | 10/2006 | Kennedy, Jr. et al. |
| 2007/0027997 | A1* | 2/2007 | Polk .............................. 709/230 |
| 2007/0060097 | A1* | 3/2007 | Edge et al. ................. 455/404.1 |
| 2007/0087689 | A1 | 4/2007 | Kennedy, Jr. et al. |
| 2007/0111746 | A1 | 5/2007 | Anderson et al. |
| 2007/0155401 | A1 | 7/2007 | Ward et al. |
| 2007/0155489 | A1 | 7/2007 | Beckley et al. |
| 2007/0202885 | A1 | 8/2007 | Kennedy, Jr. et al. |
| 2007/0232322 | A1* | 10/2007 | Jagadeesan et al. ........ 455/456.1 |
| 2008/0032736 | A1* | 2/2008 | Bari et al. ................... 455/552.1 |
| 2008/0132244 | A1 | 6/2008 | Anderson et al. |
| 2008/0132247 | A1 | 6/2008 | Anderson et al. |
| 2008/0137524 | A1 | 6/2008 | Anderson et al. |
| 2008/0158059 | A1 | 7/2008 | Bull et al. |
| 2008/0160952 | A1 | 7/2008 | Bull et al. |
| 2008/0160953 | A1 | 7/2008 | Mia et al. |
| 2008/0161015 | A1 | 7/2008 | Maloney et al. |
| 2008/0248811 | A1 | 10/2008 | Maloney et al. |
| 2008/0261611 | A1 | 10/2008 | Mia et al. |
| 2008/0261612 | A1 | 10/2008 | Mia et al. |
| 2008/0261613 | A1 | 10/2008 | Anderson et al. |
| 2008/0261614 | A1 | 10/2008 | Mia et al. |
| 2009/0005061 | A1 | 1/2009 | Ward et al. |

OTHER PUBLICATIONS

Unknown author, "Telecommunications and Internet Converged Servicse and Protocols for Advanced Networking (TISPAN); Analysis of Location Information Standards produced by various SDOs," European Telecommunications Standards Institute (ETSI) draft v0.3. 0, STF 321 Working Document, Jul. 2007 (relevant section is 7.1).

Y. Zhao, "Standardization of Mobile Phone Positioning for 3G Systems," IEEE Communications Magazine, Jul. 2002, pp. 108-116.

C. Drane, M. Macnaughtan, and C. Scott, "Positioning GSM Telephones," IEEE Communications Magazine, Apr. 1998, pp. 46-54, 59.

J. Caffery, Jr., and G. Stuber, "Overview of Radiolocation in CDMA Cellular Systems," IEEE Communications Magazine, Apr. 1998, pp. 38-45.

T. Rappaport, J.H. Reed and B.D. Woerner, "Position Location Using Wireless Communications on Highways of the Future," IEEE Communications Magazine, Oct. 1996, pp. 33-41.

I. Ziskind and M. Wax, "Maximum Likelihood Localization of Multiple Sources by Alternating Projection," IEEE Transactions on Acoustics, Speech, and Signal Porcessing, vol. 36, No. 10, pp. 1553-1560, Oct. 1988.

G.W.K. Colman, "A Comparison of the Accuracy of TDOA and TOA Location Algorithms with Equivalent Receiver Geometry," Defence R&D Canada Technical Memorandum (DREO TM 2001-063), Oct. 2001, pp. 1-53.

L. Mailaender, "On the Geolocation Bounds for Round-Trip Time-of-Arrival and All Non-Line-of-Sight Channels", EURASIP Journal on Advances in Signal Processing, vol. 2008, pp. 1-10.

N. Agarwal, L. Chaudran-Wadi, and V. Apte, "Capacity Analysis of the GSM Short Message Service", Indian Institute of Technology Bombay, www.cse.iitb.ac.in/~varsha/allpapers/wireless/ncc03cam.pdf, 2004, pp. 1-5.

J.D. Bard, and F.M. Ham, "Time Difference of Arrival Dilution of Precision and Applications," IEEE Transactions on Signal Processing, vol. 47, No. 2, pp. 521-523, Feb. 1999.

K.C. Ho, and W. Xu, "An Accurate Algebraic Solution for Moving Source Location Using TDOA and FDOA Measurements", IEEE Transactions on Signal Processing, vol. 52, No. 9, Sep. 2004, pp. 2453-2463.

C.H. Knapp and G.C. Carter, "The Generalized Correlation Method for Estimation of Time Delay," IEEE Transactions on Acoustics, Speech, and Signal Processing, vol. ASSP-24, No. 4, Aug. 1976, pp. 320-327.

M. Rahnema, "Overview of the GSM System and Protocol Architecture," IEEE Communications Magazine, Apr. 1993, pp. 92-100.

S. Stein, "Algorithms for Ambiguity Function Processing," IEEE Transactions on Acoustics, Speech, and Signal Processing, vol. ASSP-29, No. 3, Jun. 1981, pp. 588-599.

M. Vanderveen, C.B. Papadias, and A. Paulraj, "Joint Angle and Delay Estimation (JADE) for Multipath Signals Arriving at an Antenna Array", IEEE Communications Letters, vol. 1, No. 1, Jan. 1997, pp. 12-14.

M. Wax and I. Ziskind, "On Unique Localization of Multiple Sources by Passive Sensor Arrays," IEEE Transactions on Acoustics, Speech, and Signal Processing, vol. 37, No. 7, Jul. 1989, pp. 996-1000.

B. Yang, "Projection Approximation Subspace Tracking," IEEE Transactions on Signal Processing, vol. 43, No. 1, Jan. 1995, pp. 95-107.

Amir Leshem, Mati Wax, "Array Calibration in the Presence of Multipath," IEEE Transactions on Signal Processing, vol. 48, No. 1, pp. 53-59, Jan. 2000.

Xin Wang, Zongxin Wang and Bob O'Dea, "A TOA-Based Location Algorithm Reducing the Errors Due to Non-Line-of-Sight (NLOS) Propagation," IEEE Trans. Vehicular Technology, vol. 52, No. 1, Jan. 2003, pp. 112-116.

M. Vanderveen, C. Papadias, A. Paulraj, "Joint Angle and Delay Estimation (JADE) for Multipath Signals Arriving at an Antenna Array," IEEE Communications Letters, vol. 1, No. 1, Jan. 1997, pp. 12-14.

R. Schmidt, "Multiple Emitter Location and Signal Parameter Estimation," IEEE Transactions on Antennas and Propagation, vol. AP-34, No. 3, Mar. 1986, pp. 276-280.

Y. Chen, M. Zoltowski, "Joint Angle and Delay Estimation for DS-CDMA with Application to Reduced Dimension Space-Time Rake Receivers," Mar. 1999, pp. 2933-2936.

A.J. Paulraj, C.B. Papadias, "Space-Time Processing for Wireless Communications", IEEE Signal Processing Magazine, vol. 11, Nov. 1997, pp. 49-83.

C.B. Papadias, A.J. Paulraj , "Space-Time Signal Processing for Wireless Communications: A Survey", Information Systems Laboratory, Stanford University.

M. Haardt, C. Brunner, J. Nossek, "Joint Estimation of 2-D Arrival Angles, Propagation Delays, and Doppler Frequencies in Wireless Communications," Proc. IEEE Digital Signal Processing Workshop, vol. 1, pp. 1-4, Bryce Canyon National Park, Utah, Aug. 1998.

Mati Wax, "Position Location from Sensors with Position Uncertainty," IEEE Transactions Aerospace and Electronic Systems, vol. AES-19, No. 5, Sep. 1983, pp. 658-662.

D.J. Torrieri, "Statistical Theory of Passive Location Systems", IEEE Transactions Aerospace and Electronic Systems, vol. AES-20, No. 2, Mar. 1984, pp. 183-198.

Y.T. Chan and K.C. Ho, "A Simple and Efficient Estimator for Hyperbolic Location", IEEE Transactions Signal Processing, vol. 42, No. 8, Aug. 1994, pp. 1905-1915.

W.H. Foy, "Position-Location Solutions by Taylor-Series Estimation", IEEE Transactions Aerospace and Electronic Systems, vol. AES-12, No. 2, Mar. 1976, pp. 187-194.

R.G. Stansfield, "Statistical Theory of DF Fixing", Journal IEE 94, Part III A, Oct. 1947, pp. 762-770.

M.P. Wylie and J. Holtzman, "The Non-Line of Sight Problem in Mobile Location Estimation", Process IEEE 5th International Conference on Universal Personal Communications, vol. 2, Oct. 1996, pp. 827-831.

L.Cong and W. Zhuang, "Non-Line-of-Sight Error Mitigation in TDOA Mobile Location", Process IEEE Global Telecommunications Conference, vol. 1, Sep. 2001, pp. 680-684.

P.C. Chen, "A Non-Line-of-Sight Error Mitigation Algorithm in Location Estimation", Process IEEE Conference on Wireless Communications Networking, vol. 1, 1999, pp. 316-320.

N.J. Thomas, D.G.M. Cruickshank and D.I. Laurenson, "Performance of a TDOA-AOA Hybrid Mobile Location System", 3G Mobile Communication Technologies, Conference Publication No. 477, Mar. 2001, pp. 216-220.

J. Caffery, Jr., and G. Stuber, "Subscriber Location in CDMA Cellular Networks," IEEE Transactions on Vehicular Technology, vol. 47, No. 2, May 1998, pp. 406-416.

(56) References Cited

OTHER PUBLICATIONS

J. Caffery. Jr., "A New Approach to the Geometry of TOA Location," IEEE, VTC 2000, pp. 1943-1949.

M.Silventoinen and T. Rantalainen, "Mobile Station Emergency Locating in GSM", Process IEEE International Conference, Personal Wireless Communications, vol. 1, 1996, pp. 232-238.

Rick Roberts, "Project: IEEE P802.15 Working Group for Wireless Personal Area Networks (WPANs)," Harris Corporation, Melbourne Florida, Oct. 4, 2004, pp. 1-11.

Stephanie Bell, A Beginners Guide to Uncertainty of Measurement, The National Physics Laboratory of the United Kingdom of Great Britain and Northern Ireland, Teddington, Middlesex, UK, 2001, pp. 1-41.

* cited by examiner

SYSTEM AND METHOD FOR PROVIDING LOCATION SERVICES FOR MULTIPLE ACCESS NETWORKS FROM A SINGLE LOCATION SERVER

RELATED APPLICATIONS

The instant application claims the priority benefit of and is co-pending with U.S. Provisional Application No. 61/109,068, entitled, "Providing Location Service for Multiple Access Networks from a Single Location Server," filed Oct. 28, 2008, the entirety of which is incorporated herein by reference.

BACKGROUND

The location of a mobile, wireless or wired device is a useful and sometimes necessary part of many services. A Location Information Server ("LIS") may be responsible for providing location information to such devices with an access network. The LIS may utilize knowledge of the access network and its physical topology to generate and serve location information to devices.

The LIS, in general terms, is a network node originally defined in the National Emergency Number Association ("NENA") i2 network architecture addressing a solution for providing E-911 service for users of Voice over Internet Protocol ("VoIP") telephony. In VoIP networks, the LIS is the node that determines the location of the VoIP terminal. Beyond the NENA architecture and VoIP, the LIS is a service provided by an access network provider to supply location information to users of the network by utilizing knowledge of network topology and employing a range of location determination techniques to locate devices attached to the network. The precise methods used to determine location are generally dependent on the type of access network and the information that can be obtained from the device. For example, in a wired network, such as Ethernet or DSL, a wiremap method is commonplace. In wiremap location determination, the location of a device may be determined by finding which cables are used to send packets to the device. This involves tracing data through aggregation points in the network (e.g., Ethernet switches, DSL access nodes) and finding the port for which packets are sent to the device. This information is combined with data available to the LIS (generally extracted from a database) to determine a final location of the device.

In wireless networks, a range of technologies may be applied for location determination, the most basic of which uses the location of the radio transmitter as an approximation. The Internet Engineering Task Force ("IETF") and other standards forums have defined various architectures and protocols for acquiring location information from an LIS. In such networks, an LIS may be automatically discovered and location information retrieved using network specific protocols. Location information may be retrieved directly or the LIS may generate temporary uniform resource identifiers ("URI") utilized to provide location indirectly (i.e., location URI). Geodetic and civic positions of a mobile device may be determined as a function of location information from the LIS. There is, however, a need in the art to overcome the limitations of the prior art and provide a novel system and method for providing location services for multiple access networks from a single location server.

One embodiment of the present subject matter provides a method for determining the location of a target device attached to an access network connected to a location server, the location server having a plurality of access networks connected thereto. The method may comprise receiving a location request for a target device, identifying the target device as a function of one or more parameters, and identifying an access network from the plurality of access networks to which the target device is attached as a function of the one or more parameters. Each access network in the plurality of access networks connected to the location server may be assigned one or more logical identifiers by which an individual location request may be allocated to the respective access network. An estimated location of the target device may then be determined as a function of the one or more logical identifiers using a location algorithm appropriate for the identified access network.

Another embodiment of the present subject matter provides a method for locating a target device attached to an access network in a system having a plurality of distinct access networks connected thereto. The method includes receiving a location request for the target device and serving the plurality of distinct access networks using a single location server without regard to underlying protocols employed by the access networks and target device.

A further embodiment of the present subject matter provides a system having a location server with a plurality of location generators for receiving location requests for target devices and for determining a location of the target devices, the location requests having one or more parameters and being classified into location groups having as a function of at least one common parameter. The location server may also include a plurality of location determination functions for each location generator. The system may include a plurality of access networks connected to the location server, each access network being associated with a location generator as a function of a range of logical identifiers by which a location request may be allocated to the respective access network, wherein the location groups restrict a range of target devices locatable by a location request as a function of said one or more parameters, and wherein each location determination function corresponds to a location algorithm appropriate for a respective access network.

These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

Various aspects of the present disclosure will be or become apparent to one with skill in the art by reference to the following detailed description when considered in connection with the accompanying exemplary non-limiting embodiments.

DETAILED DESCRIPTION

With reference to the figures where like elements have been given like numerical designations to facilitate an understanding of the present subject matter, the various embodiments of a system and method for providing location services for multiple access networks from a single location server are herein described.

As generally discussed above, the Location Information Server ("LIS") is a network server that provides devices with information about their location. The phrases and respective acronyms of Location Information Server ("LIS") and Location Server ("LS") are used interchangeably throughout this document and such should not limit the scope of the claims appended herewith. Devices that require location information are able to request their location from the LIS. In the architectures developed by the IETF, NENA and other standards forums, the LIS may be made available in an exemplary IP access network connecting one or more target devices to the Internet. In other modes of operation, the LIS may also provide location information to other requesters relating to a target device. To determine location information for a target device, an exemplary LIS may utilize a range of methods. The LIS may use knowledge of network topology, private interfaces to networking devices like routers, switches and base stations, and location determination algorithms. Exemplary algorithms may include known algorithms to determine the location of a mobile device as a function of satellite information, satellite assistance data, various downlink or uplink algorithms such as, but not limited to, time difference of arrival ("TDOA"), time of arrival ("TOA"), angle of arrival ("AOA"), round trip delay ("RTD"), signal strength, advanced forward link trilateration ("AFLT"), enhanced observed time difference ("EOTD"), observed time difference of arrival ("OTDOA"), uplink-TOA and uplink-TDOA, enhanced cell/sector and cell-ID, etc., and hybrid combinations thereof.

A location server according to an embodiment of the present subject matter may utilize a range of inputs in order to determine location information for the target device. From a request made of the location server, the location server may determine one or more parameters, e.g., Internet Protocol ("IP") and Media Access Control ("MAC") addresses, that uniquely identify the target mobile device. This identification information may be used as an input to an exemplary measurement collection process that produces further information in the form of measurements or measurement results. Measurement information may be data already known to the location server, additional parameters that identify the target mobile device in other ways, and/or parameters relating to the network attachment of the target mobile device. Non-limiting examples include the MAC address of the device, the identity of network nodes from which network traffic to and from the device transits (including any physical connections involved), the location of network intermediaries (e.g., wiring maps), radio timing, signal strength measurements and other terrestrial radio frequency information, and network configuration parameters, to name a few.

Protocols such as Flexible LIS-ALE Protocol ("FLAP") are being developed in the Alliance for Telecommunications Industry Solutions ("ATIS") forum to provide a formal definition of location-related measurements for different types of access networks. FLAP generally facilitates transfer of values of location measurement parameters from a network to the LIS to enable the latter to compute the location of an IP end-device. The LIS may interact with an Access Location Entity ("ALE") residing in an access network to retrieve location measurements. Location information may be retrieved directly or the LIS may generate temporary uniform resource identifiers ("URI") utilized to provide location indirectly (i.e., location URI). Geodetic, civic positions and location URIs for a mobile device may be determined as a function of location information from the LIS. A request for geodetic and/or civic locations may provide location information at the time the location request is made. A location URI may be passed to another party which can utilize it to retrieve the target device's location at a later time, typically from the same location server that provided the location URI.

Figure 1A:
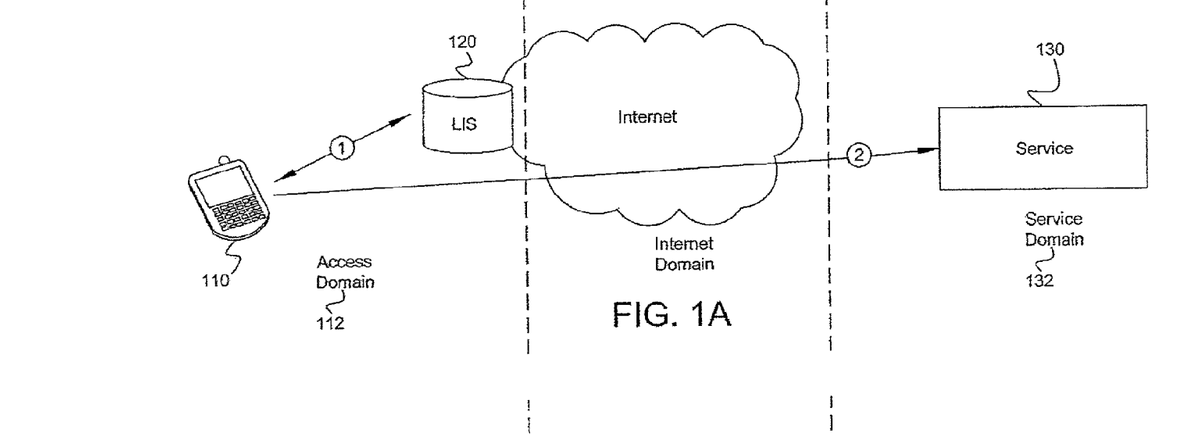
FIGS. 1A-1C are diagrams of Internet location services models.
Figure 1B:
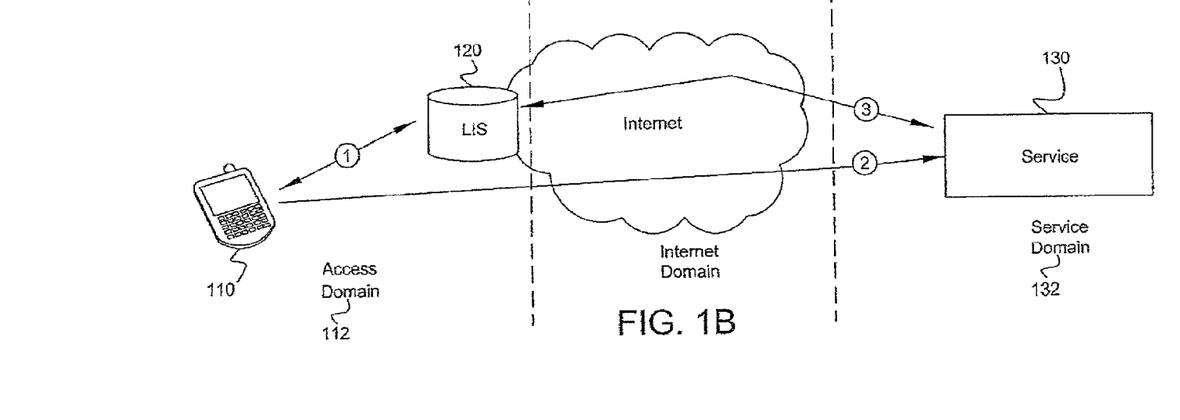
Figure 1C:
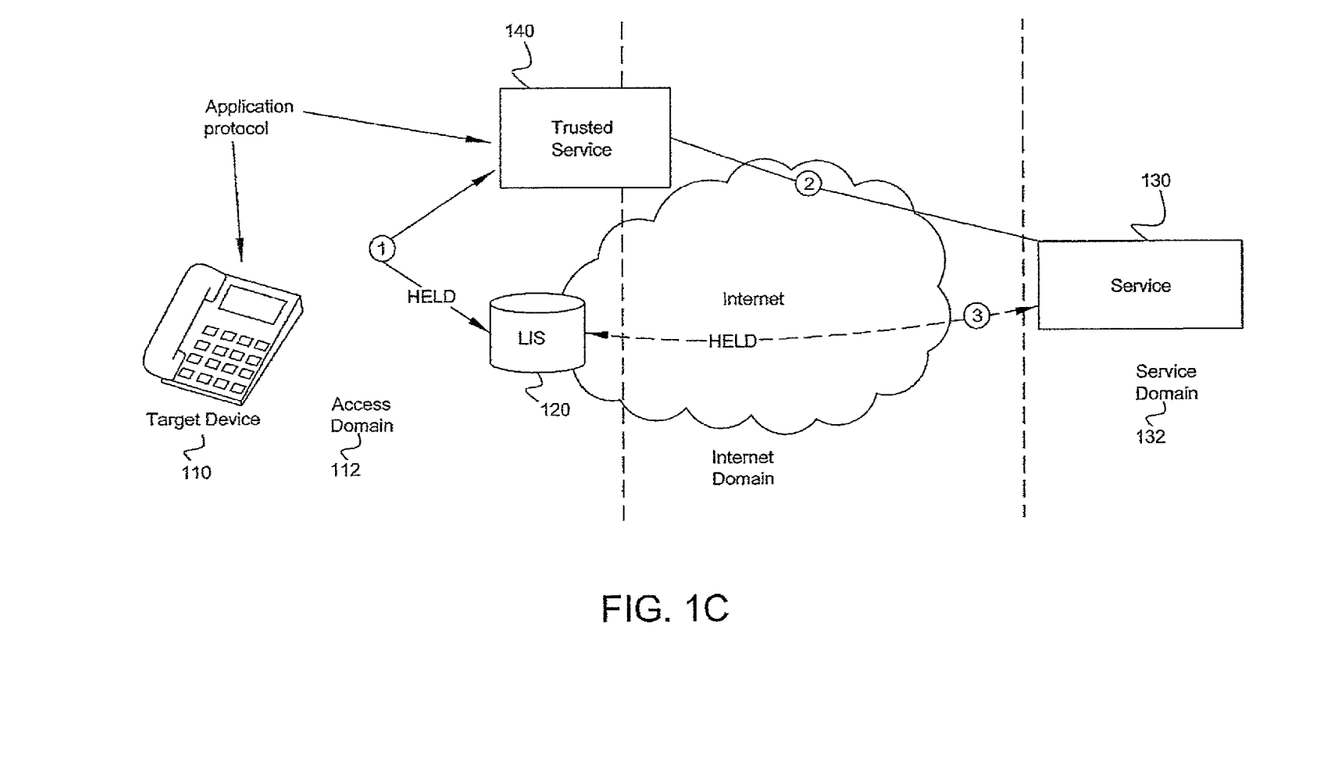

There are many models in which an LIS may be utilized. For example, FIGS. 1A-1C provide three examples of Internet location services models for an LIS. With reference to FIG. 1A, a location by value model is provided in which a target device 110 may obtain a location from a location server 120 in a respective access network or domain 112. The device 110 may then convey its location to a location based service 130 in the service domain 132 using an appropriate application protocol. With reference to FIG. 1B, a location by reference model is provided in which a mobile device 110 may obtain a reference from the location server 120 in the respective access network or domain 112. The device 110 may convey the reference to the location based service 130 in the service domain using an appropriate application protocol. The service 130 may then query the location server 120 direct for location values for the device 110. Generally the protocol utilized for communication between the device 110 and location server 120 is HTTP Enabled Location Delivery ("HELD") and the protocol utilized for communication between the location server 120 and the service 130 is HELD. The protocol utilized for communication between the device 110 and the service 130 is application protocol dependent.

With reference to FIG. 1C, an on-behalf-of ("OBO") location model is provided in which a trusted third party application or service 140 queries for the location of a device 110. A client identity, which is understood by the location server 120, may be used as a query parameter (e.g., IP or MAC address). If applicable, the third party 140 may provide location information to external service entities 130. If the location was requested and provided by reference, the external entity 130 may query back to the location server 120 for location value updates using the HELD protocol. The above described Internet location services models illustrate how LIS clients may request and receive location information from the LIS. The value of parameters derived from such a communications network may be used by the device and may be used by the LIS to determine location. In order to make use of these parameters, it is necessary for their values to be transferred from the communication network elements to the LIS, which is one purpose of FLAP.

Figure 2:
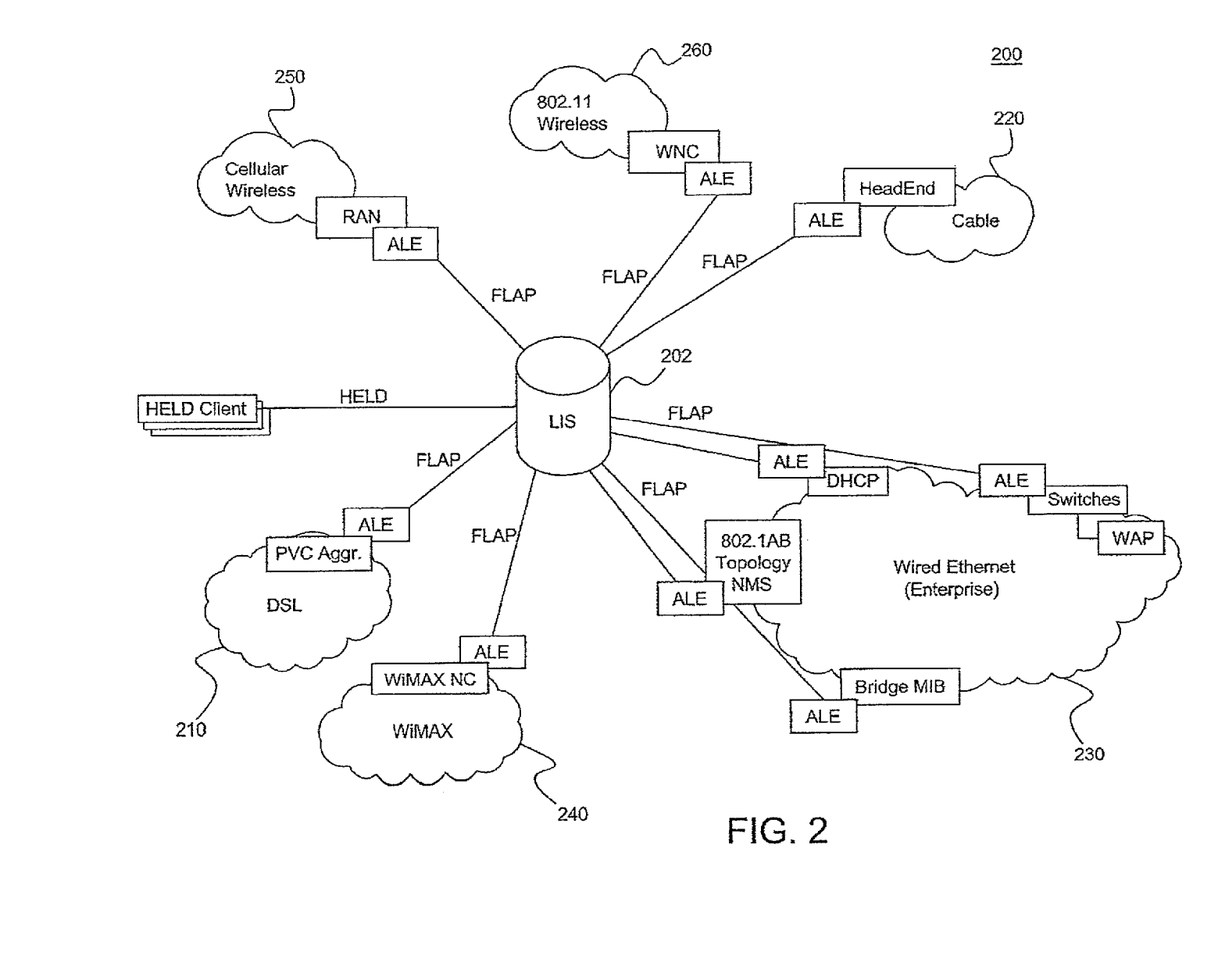
FIG. 2 is a diagram of an exemplary access network model.

FIG. 2 is a diagram of an exemplary access network model. With reference to FIG. 2, an exemplary access network model 200 may include one or more LISs 202 connected to one or more access networks, 210-260. An access network refers to a network that provides a connection between a device and the Internet. This may include the physical infrastructure, cabling, radio transmitters, switching and routing nodes and servers. The access network may also cover services required to enable IP communication including servers that provide addressing and configuration information such as DHCP and DNS servers. Examples of different types of access networks include, but are not limited to, DSL 210, cable 220, WiFi, wired Ethernet 230, WiMAX 240, cellular packet services 250, and 802.11 wireless 260, among others. In a preferable embodiment of the present subject matter, the access network model 200 includes a single LIS or LS 202 whereby multiple access networks of any type can be provided service from the single LS 202.

An LS according to a preferred embodiment of the present subject matter may be responsible for providing location information about target devices in one or more access networks for which the LS is responsible. The LS may uniquely identify a target device in an access network as a function of a Target Identifier ("Target-ID"). Examples of Target-IDs may be, but are not limited to, IP and MAC addresses. Generally, a set of Target-ID types for a given access network type is small. Knowledge of the type of access network means that the types of Target-IDs that may be utilized are also known, and having an instance of an access network means that the ranges of Target-IDs may be known. Thus, embodiments of the present subject matter provide an LS adaptable to select the correct access network once a Target-ID is known.

Thus, a system according to one embodiment of the present subject matter may include a single location server serving multiple and/or distinct access networks. Within the location server, each served access network may be provided with a corresponding logical representation, and associated with this logical access network are the resources within that respective access network the location server may employ. For example, each logical access network may include a separate set of configurations that include all the information necessary for the location server to provide location information to devices within that access network. Similarly, a method according to an embodiment of the present subject matter may upon receiving a location request, identify a target device by the location server. Exemplary identifier information available to the location server may include information explicitly provided by a requester and/or implicitly provided identifier information such as, but not limited to, source addressing information included in the respective request packets. Identifiers may also include both permanent attributes of the device and temporary addressing information, e.g., MAC addresses, IP addresses, Ethernet Hardware Addresses, hardware addresses, adapter addresses, and/or other hardware or software addresses.

An exemplary location server may then utilize the identification information to determine the access network to which the target device is attached. Each logical access network within the location server may be assigned a range or set of identifiers by which an individual request may be allocated to that access network. In certain embodiments of the present subject matter, the location server may need to gather additional information necessary to identify the access network. Some exemplary additional information may be external to the network; thus in one embodiment, the identification of the access network may include collecting information external to the access network. This information may be provided by a database. Additionally, this information external to the access network may require the use of a network protocol query to procure. Once the access network serving the target device has been identified, the location server may then apply methods appropriate to the access network in determining a location of the device. Thus, embodiments of the present subject matter provide an ability to serve disparate types of access networks from the same location server, and while the methods appropriate to these different types of access networks may be significantly different, being able to identify the access network may enable disparate networks to be served from the same location server. In one embodiment, separation of access networks may be provided for access networks having the same type. Additionally, different access networks may also be completely partitioned whereby the same location server may provide service for two or more access networks without mixing information from the respective networks.

Figure 3:
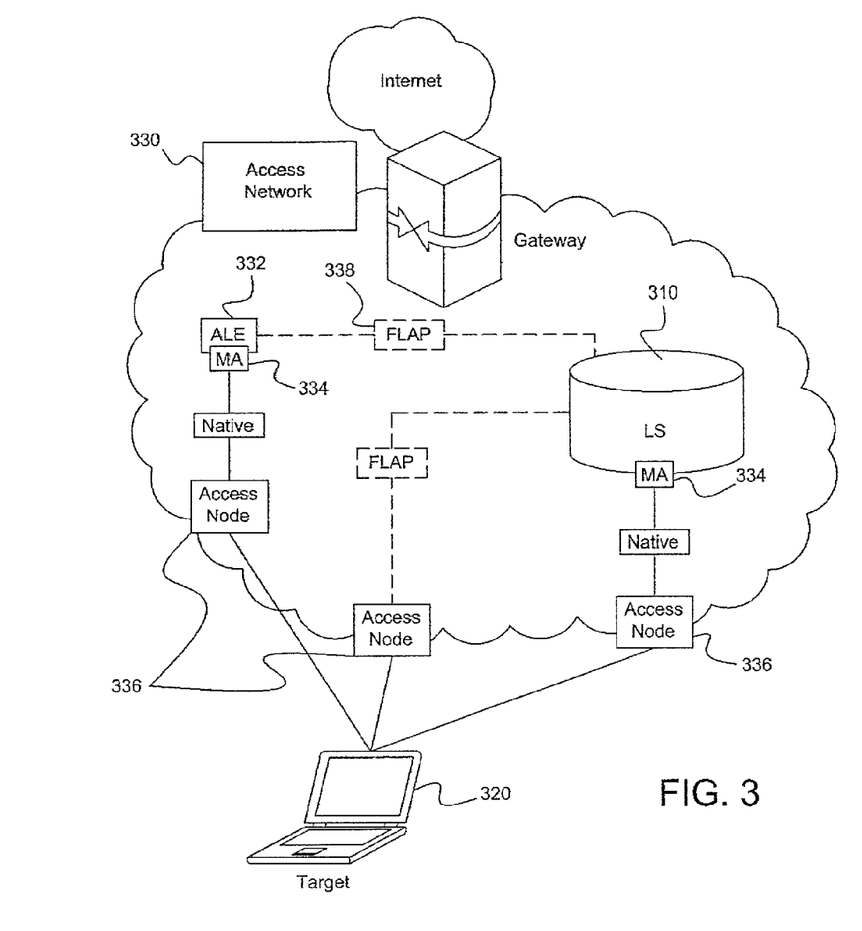
FIG. 3 is a diagram of a location server to access network model according to one embodiment of the present subject matter.

FIG. 3 is a diagram of an LS to access network model according to one embodiment of the present subject matter. With reference to FIG. 3, an exemplary LS 310 may determine a location of the target device 320 in an access network 330 using measurements obtained from the access network 330. The LS 310 may obtain these measurements either from an Access Location Entity(ies) ("ALE") 332 and/or measurement adapter(s) ("MA") 334 resident in the access network 330. Since the target device 320 generally resides in the access network 330 (or the LS cannot find it), the MAs 334 and ALEs 332 are also bound to the access network 330. The target device 320 generally connects to the access network 330 via an access node 336. How MAs 334 or the LS 310 communicate with access nodes 336 or gain information from access nodes 336 is node-specific.

An LS 310 according to an embodiment of the present subject matter may be designed and produced with a predetermined number or type(s) of access network with which to interface. It is the type of access network which governs the measurements that may be taken, and hence the location determination algorithms that may be employed by the LS 310. As the types of access network that the LS may be deployed in are known, the MA types 334, ALE types 332, FLAP schema-types 338, and location determination function ("LDF") types are all known thus simplifying data-fill options.

Figure 4:
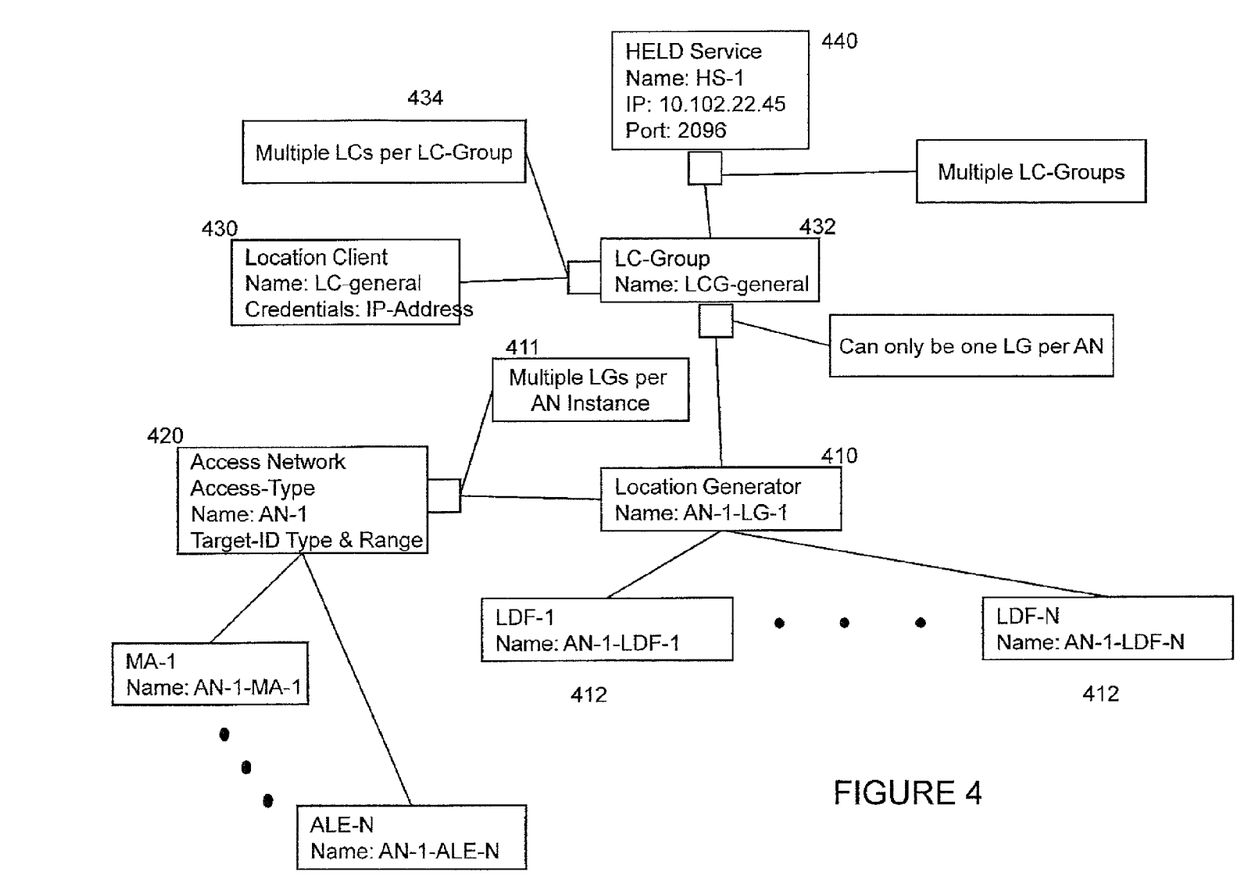
FIG. 4 is a diagram of a client connection to location determination model according to an embodiment of the present subject matter.

FIG. 4 is a diagram of a client connection to location determination model according to an embodiment of the present subject matter. With reference to FIG. 4, a Location Generator 410 may be responsible for receiving a location request for a target device, determining a location of the target device, and packaging an appropriate response into a Presence Information Data Format-Location Object ("PIDF-LO"). It is the Location Generator 410 that provides the linkage between an access network instance 420 and a set of Location Determination Functions ("LDF") 412. To simplify the model, a Location Generator 410 may be associated with or tied to an access network instance 420 and a specific set of LDFs 412. A range of location options are provided to the access network instance 420 by allowing multiple Location Generators 411 per each access network instance 420, each having a different set of LDFs.

Any query of the LS for the location of a target device may be referred to as a Location Client ("LC") 430. Examples of an LC 430 include, but are not limited to, a target device requesting its own location, or an authorized third party requesting the location of a target device. LCs 430 may be classified into groups, referred to as LC-Groups 432.

The LS provides service by making a HELD Service 440 accessible to networks from which it will permit LCs 430 to connect. An LC 430 is identified when it connects to the LS by a combination of the HELD Service 440 to which it connects and the authentication credentials the LC 430 provides to the LS (which may include none). The LC-Group 432 governs the access networks 420 in which location determination may occur and may thus restrict the range of target devices locatable by a set of LCs. This may be accomplished by data-filling access network to Location Generator pairs into the LC-Group 432. Each access network 420 generally possesses a single Location Generator 410 in a given LC-Group 432. The correct access network 420 may be identified by the Target-ID included in the location request. Thus, embodiments of the present subject matter stem from the abstraction illustrated in FIG. 4 that represents access networks as a logical entity within the location server.

Figure 5:
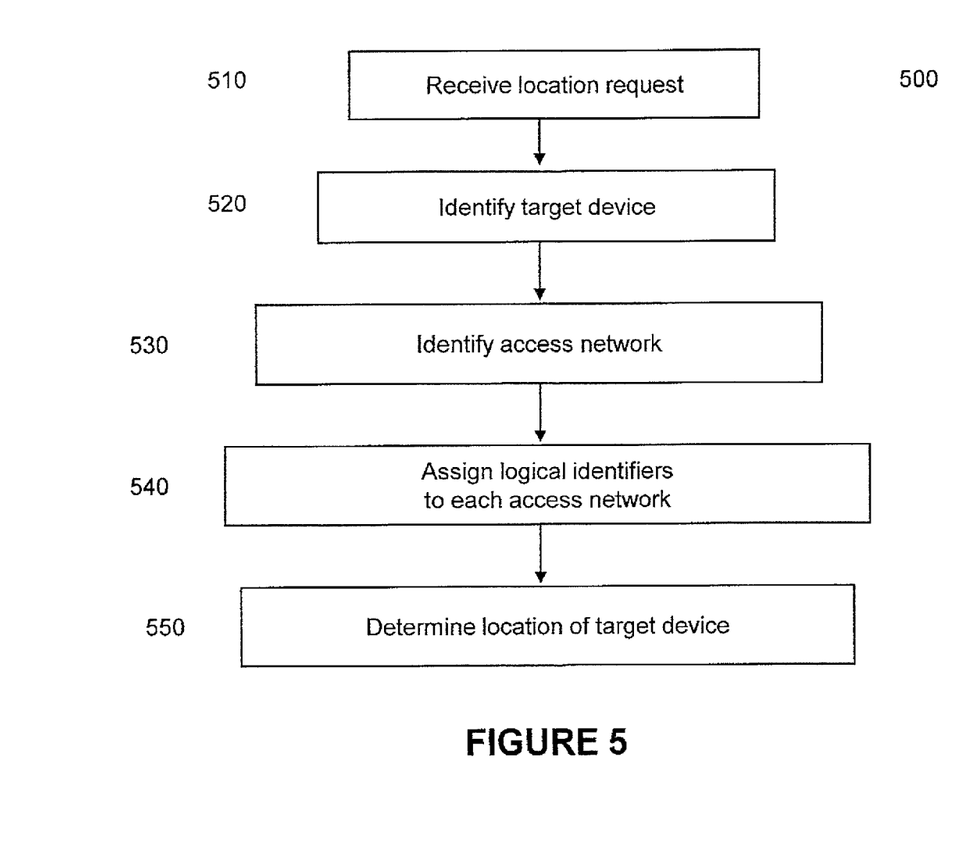
FIG. 5 is an algorithm according to one embodiment of the present subject matter.

FIG. 5 is an algorithm according to one embodiment of the present subject matter. With reference to FIG. 5, a method 500 is provided for determining the location of a target device attached to an access network connected to a location server, the location server having a plurality of access networks connected thereto. Exemplary target devices may be a cellular device, text messaging device, computer, portable computer, vehicle locating device, vehicle security device, communication device, or wireless transceiver. Exemplary access networks may be Digital Subscriber Line networks, cable networks, WiFi networks, wired Ethernet networks, Worldwide Interoperability for Microwave Access networks, cellular packet service networks, and 802.11 wireless networks.

At step 510, a location request may be received for a target device, and at step 520 the target device may be identified as a function of one or more parameters. Exemplary parameters may be any one, range or set of Internet Protocol addresses, Media Access Control addresses, Ethernet Hardware Address, hardware address, adapter address, other hardware or software addresses, information provided by a requester, source addressing information included in a location request packet, and combinations thereof. In one embodiment, step 510 may further include classifying a received location request into a group, the group having one or more common identifiers. At step 530, an access network may be identified from the plurality of access networks to which the target device is attached as a function of the one or more parameters. In certain embodiments of the present subject matter, the LS may need to gather additional information necessary to identify the access network. Some exemplary additional information may also be external to the network; thus in one embodiment, step 530 may include identifying an access network by collecting information external to the access network. This information may be external to the access network and may be provided by a database. Additionally, this information external to the access network may require the use of a network protocol query to procure.

Each access network in the plurality of access networks connected to the location server may be assigned at step 540 one or more logical identifiers by which an individual location request may be allocated to the respective access network. At step 550, an estimated location of the target device may then be determined as a function of the one or more logical identifiers using a location algorithm appropriate for the identified access network. The location of the device may thus be determined as a function of satellite information, satellite assistance data, TDOA, TOA, AOA, RTD, signal strength, AFLT, EOTD, OTDOA, uplink/downlink-TOA and uplink/downlink-TDOA, enhanced cell/sector and cell-ID, or hybrid combinations thereof. One embodiment of the present subject matter may include the step of formatting a location response and providing the response to a requesting entity. This location response may be formatted as a PIDF-LO.

Figure 6:
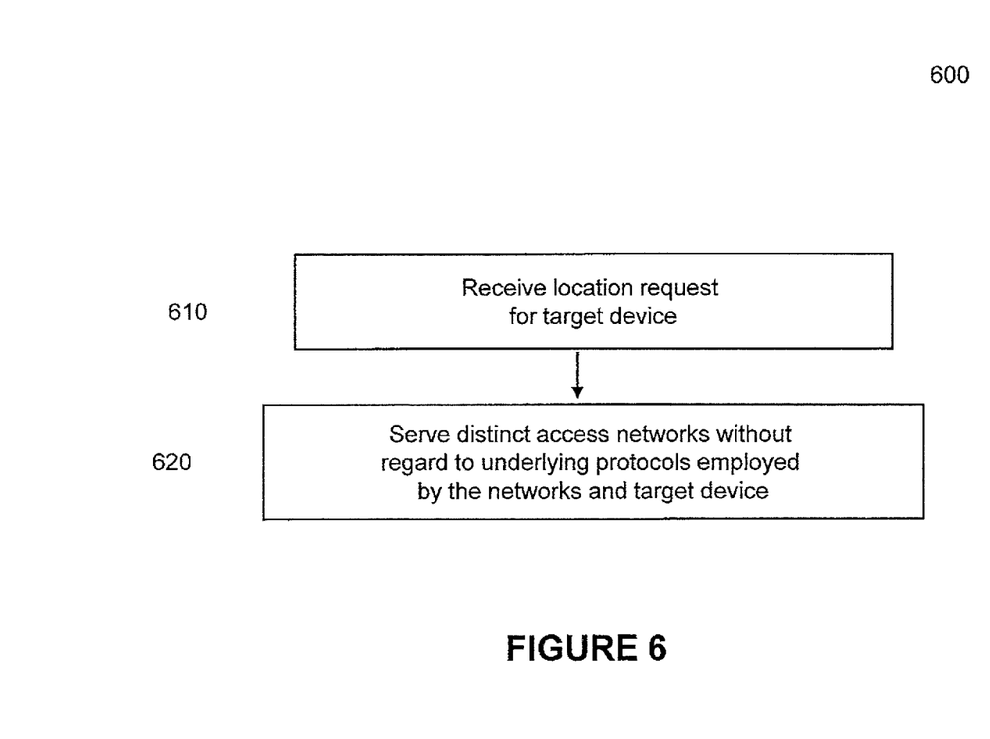
FIG. 6 is an algorithm according to another embodiment of the present subject matter.

FIG. 6 is an algorithm according to another embodiment of the present subject matter. With reference to FIG. 6, a method 600 is provided for locating a target device attached to an access network in a system having a plurality of distinct access networks connected thereto. At step 610, a location request may be received for the target device, and at step 620, the plurality of distinct access networks may be served using a single location server without regard to underlying protocols employed by the access networks and target device. In one embodiment, the method may further include assigning each access network in the plurality of access networks a range of logical identifiers by which the location request for the target device may be allocated to the respective access network. Another embodiment may also include determining an estimated location of the target device as a function of a location algorithm appropriate for the access network to which the target device is attached.

It is thus an object of embodiments of the present subject matter to enable cost-effective deployment of location servers in a central location to serve multiple and/or different access networks. Another object of embodiments of the present subject matter is to enable a consolidation of multiple location servers, from geographically diverse access networks.

FIGS. 5-6 illustrate high-level logic flow diagrams for exemplary process steps for implementing the method and system of the present subject matter. These steps are those requiring a physical manipulation of physical quantities. Usually, although not necessarily, these quantities take the form of signals capable of being stored, transmitted, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "receiving," "identifying," "assigning," "determining," and the like, may commonly be associated with mental or physical operations performed by a human operator; however, no such capability of a human operator is possible or desirable in most cases of the operations described herein. As indicated herein, these operations are primarily machine operations. Useful machines for performing operations of a preferred embodiment of the present subject matter include data-processing systems, servers, etc. The present subject matter relating to method steps for processing signals to generate other desired signals can generally be implemented via a computer or microcomputer.

As shown by the various configurations and embodiments illustrated in FIGS. 1-6, a system and method for providing location services for multiple access networks from a single location server have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method for determining the location of a target device attached to an access network connected to a single location server, the single location server having a plurality of access networks connected thereto and serves the plurality of access networks without regard to underlying protocols employed by the access networks and target device, the method comprising the steps of:
    (a) receiving a location request for a target device;
    (b) identifying the target device as a function of one or more parameters;
    (c) identifying an access network from the plurality of access networks to which the target device is attached as a function of the one or more parameters;
    (d) assigning each access network in the plurality of access networks connected to the location server one or more logical identifiers by which an individual location request may be allocated to the respective access network; and (e) determining an estimated location of the target device as a function of the one or more logical identifiers using a location algorithm appropriate for the identified access network.

2. The method of claim 1 wherein the step of identifying an access network further comprises collecting information external to the access network.

3. The method of claim 2 wherein the information external to the access network is provided by a database.

4. The method of claim 2 wherein the information external to the access network requires the use of a network protocol query.

5. The method of claim 1 wherein the one or more parameters are selected from the group consisting of: Internet Protocol addresses, Media Access Control addresses, Ethernet Hardware Address, hardware address; adapter address, other hardware or software addresses, information provided by a requester, source addressing information included in a location request packet, and combinations thereof.

6. The method of claim 1 wherein the one or more parameters is a range or set of parameters.

7. The method of claim 1 wherein the target device is selected from the group consisting of: cellular device, text messaging device, computer, portable computer, vehicle locating device, vehicle security device, communication device, and wireless transceiver.

8. The method of claim 1 wherein the location of the device is determined as a function of: satellite information, satellite assistance data, time difference of arrival ("TDOA"), time of arrival ("TOA"), angle of arrival ("AOA"), round trip delay ("RTD"), signal strength, advanced forward link trilateration ("AFLT"), enhanced observed time difference ("EOTD"), observed time difference of arrival ("OTDOA"), uplink-TOA and uplink-TDOA, enhanced cell/sector and cell-ID, or hybrid combinations thereof.

9. The method of claim 1 wherein the access network is selected from the group consisting of: Digital Subscriber Line network, cable network, WiFi network, wired Ethernet network, Worldwide Interoperability for Microwave Access network, cellular packet service network, and 802.11 wireless network.

10. The method of claim 1 further comprising the step of formatting a location response and providing the response to a requesting entity.

11. The method of claim 10 wherein the location response is formatted as a Presence Information Data Format-Location Object ("PIDF-LO").

12. The method of claim 1 wherein the step of receiving further comprises classifying a received location request into a group, the group having one or more common identifiers.

13. A system comprising:
(a) a single location server having:
(i) a plurality of location generators for receiving location requests for target devices and for determining a location of the target devices, the location requests having one or more parameters and being classified into location groups having as a function of at least one common parameter,
(ii) a plurality of location determination functions for each location generator; and
(b) a plurality of access networks connected to and served by the single location server without regard to underlying protocols employed by the access networks and target devices, each access network being associated with a location generator as a function of a range of logical identifiers by which a location request may be allocated to the respective access network,
wherein the location groups restrict a range of target devices locatable by a location request as a function of said one or more parameters, and
wherein each location determination function corresponds to a location algorithm appropriate for a respective access network;
wherein said single location server comprises a processor.

14. he system of claim 13 wherein the one or more parameters are selected from the group consisting of: Internet Protocol addresses, Media Access Control addresses, Ethernet Hardware Address, hardware address, adapter address, other hardware or software addresses, information provided by a requester, source addressing information included in a location request packet, and combinations thereof.

15. The system of claim 13 wherein the target device is selected from the group consisting of: cellular device, text messaging device, computer, portable computer, vehicle locating device, vehicle security device, communication device, and wireless transceiver.

16. The system of claim 13 wherein the location determination function determines a location of a target device as a function of: satellite information, satellite assistance data, time difference of arrival ("TDOA"), time of arrival ("TOA"), angle of arrival ("AOA"), round trip delay ("RTD"), signal strength, advanced forward link trilateration ("AFLT"), enhanced observed time difference ("EOTD"), observed time difference of arrival ("OTDOA"), uplink-TOA and uplink-TDOA, enhanced cell/sector and cell-ID, and hybrid combinations thereof.

* * * * *